United States Patent [19]

Hoehn, Jr.

[11] Patent Number: 4,593,770
[45] Date of Patent: Jun. 10, 1986

[54] METHOD FOR PREVENTING THE DRILLING OF A NEW WELL INTO ONE OF A PLURALITY OF PRODUCTION WELLS

[75] Inventor: Gustave L. Hoehn, Jr., Dallas, Tex.

[73] Assignee: Mobil Oil Corporation, New York, N.Y.

[21] Appl. No.: 668,922

[22] Filed: Nov. 6, 1984

[51] Int. Cl.⁴ .............................................. E21B 46/00
[52] U.S. Cl. ........................................ 175/45; 175/40; 166/66.5; 324/346
[58] Field of Search ................. 166/65 M, 250, 254; 175/40, 45; 324/345, 346, 356, 368, 369

[56] References Cited

U.S. PATENT DOCUMENTS

| | | | |
|---|---|---|---|
| 3,285,350 | 11/1966 | Henderson | 175/57 |
| 3,488,574 | 1/1970 | Tanguy | 324/368 X |
| 3,722,605 | 3/1973 | Isham | 175/40 |
| 3,731,752 | 5/1973 | Schad | 175/45 |
| 4,372,398 | 2/1983 | Kuckes | 175/45 |
| 4,443,762 | 4/1984 | Kuckes | 175/45 X |
| 4,458,767 | 7/1984 | Hoehn, Jr. | 175/61 |
| 4,465,140 | 8/1984 | Hoehn, Jr. | 166/381 |
| 4,529,939 | 7/1985 | Kuckes | 166/250 X |

*Primary Examiner*—George A. Suchfield
*Attorney, Agent, or Firm*—A. J. McKillop; Michael G. Gilman; George W. Hager, Jr.

[57] ABSTRACT

A logging sonde injects alternating current into the well casings of a plurality of producing wells at desired subsurface depth points. The resulting magnetic fields created around the well casings of the producing wells are detected by a magnetometer in a new well being drilled to prevent drilling into one of the production wells.

3 Claims, 3 Drawing Figures

METHOD FOR PREVENTING THE DRILLING OF A NEW WELL INTO ONE OF A PLURALITY OF PRODUCTION WELLS

BACKGROUND OF THE INVENTION

The borehole of producing oil and gas wells is typically lined from top to bottom with steel casing anchored by a sheath of cement that is securely and circumferentially bonded to both the casing and the wall of the wellbore. Oftentimes production wells are drilled at extreme depths with the drilled wellbore deviating substantially from the vertical. There is, therefore, the need for a reliable method of locating the wellbore of such production wells, especially when a new well is being drilled in the vicinity of the producing well to prevent the drilling into such producing well.

In one conventional drilling practice, the direction and position of the production wellbore was determined at the time of drilling by running hole direction surveys and processing the directional data for wellbore position. The directional measurements are commonly made using a magnetic compass and inclinometer. The standard deviation of these directional measurements is not accurately known, but is probably greater than the resolution of the instruments. There are other random errors due to instrument friction and mounting instability, tool alignment in the wellbore, gravity pertubations, magnetic variation uncertainty, magnetic disturbance of the drill pipe, etc. In addition to these random errors, there are bias errors. The largest bias error is probably in the compass reading caused mostly by poor calibration and the drillpipe magnetic disturbance. The total directional bias error can range up to a few degrees or even more.

Another method that has been used in such well location efforts is by searching with a magnetometer in the well being drilled for the magnetic anomaly created by the well casing of the producing well, as taught in U.S. Pat. No. 4,458,767 to Hoehn. The natural magnetization of the well casing due to the earth's magnetic field produces an anomaly in the total magnetic field which may be detected with a proton magnetometer at distances up to a few hundred feet. Also, a well casing may be magnetized by means of an internal magnetizer being advanced through the well casing to create a magnetic anomaly along the well casing, as taught in U.S. Pat. No. 4,465,140 to Hoehn.

In U.S. Pat. No. 4,372,398 to Kuckes, there is described a system wherein the well being drilled contains a device for magnetizing a different well through a current injection by way of the formation between the well being drilled and such different well.

SUMMARY OF THE INVENTION

In accordance with the present invention, there is provided a method for preventing the drilling of a new well into any one of a plurality of existing wells, such as production wells.

A borehole tool is lowered into one of the plurality of existing wells and an alternating current flow is injected into the well casing by way of the borehole tool at a selected depth point. A first magnetic field is created above the current injection point around the well due to the difference in the opposing current flows downward through the borehole tool and its support cable to the point of injection and upwardly through the well casing from the point of injection. A second magnetic field is created below the current injection point around the well casing due to the downward current flow through the well casing from the injection point. These first and second magnetic fields are both equal in direction and magnitude so as to create a uniform magnetic field along the length of the well casing both above and below the current injection point. This step of creating a detectable magnetic field around the well is repeated for each of the plurality of existing wells, each such step utilizing a differing alternating current frequency for each of the existing wells so as to create a differing detectable magnetic field around each of the existing wells.

A magnetometer is located downhole in a non-magnetic section of the drill string of the new well being drilled. Such magnetometer detects the differing magnetic fields around the existing wells. Drilling of the new well is redirected when the measurement of the differing magnetic fields indicates that the continued drilling of the new well would result in the intersection of the new well with one of the existing wells.

DESCRIPTION OF THE PREFERRED EMBODIMENT

Figure 1:
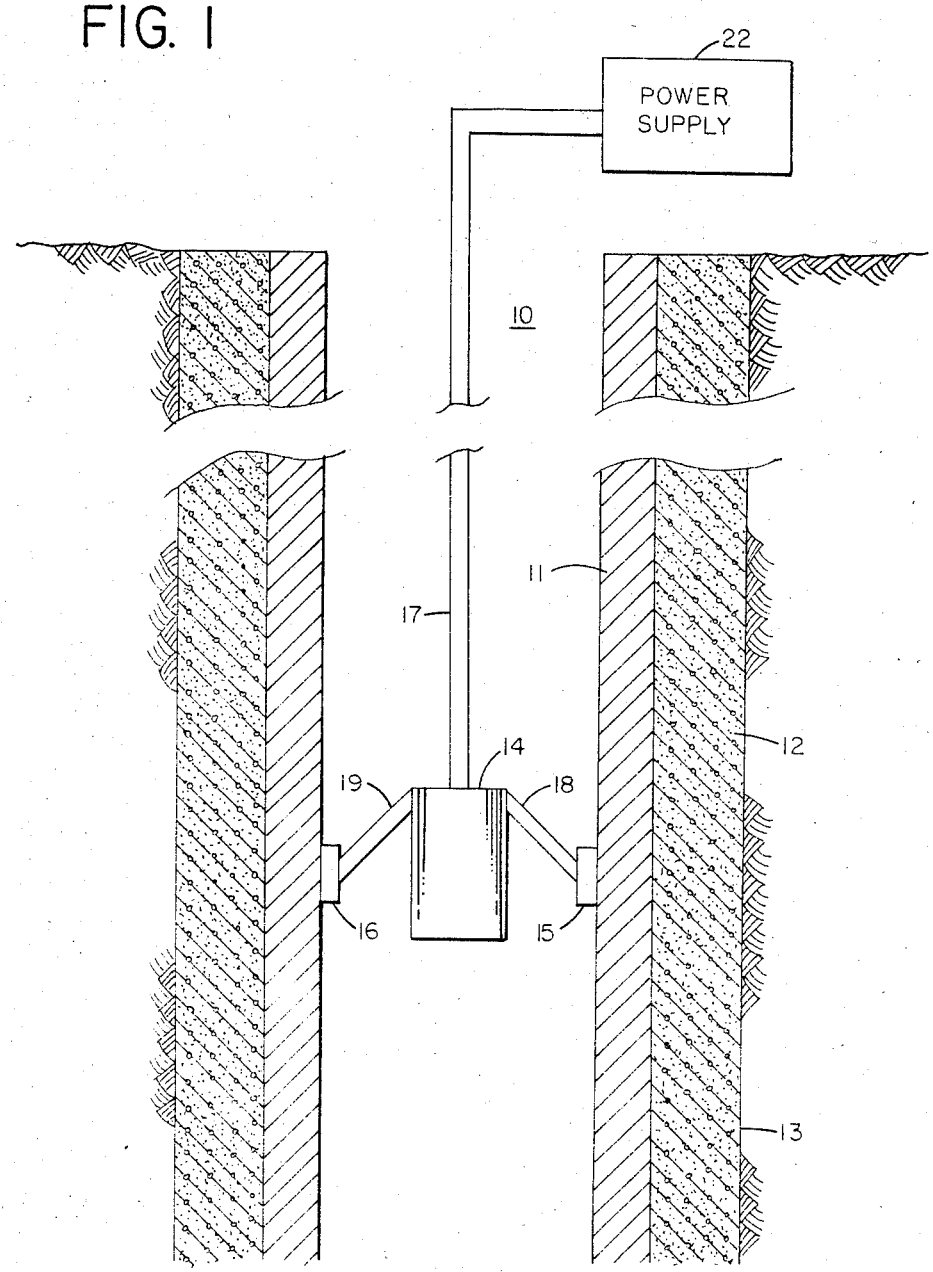
FIG. 1 illustrates a downhole sonde for injecting current into a well casing in accordance with the present invention.
Figure 2:
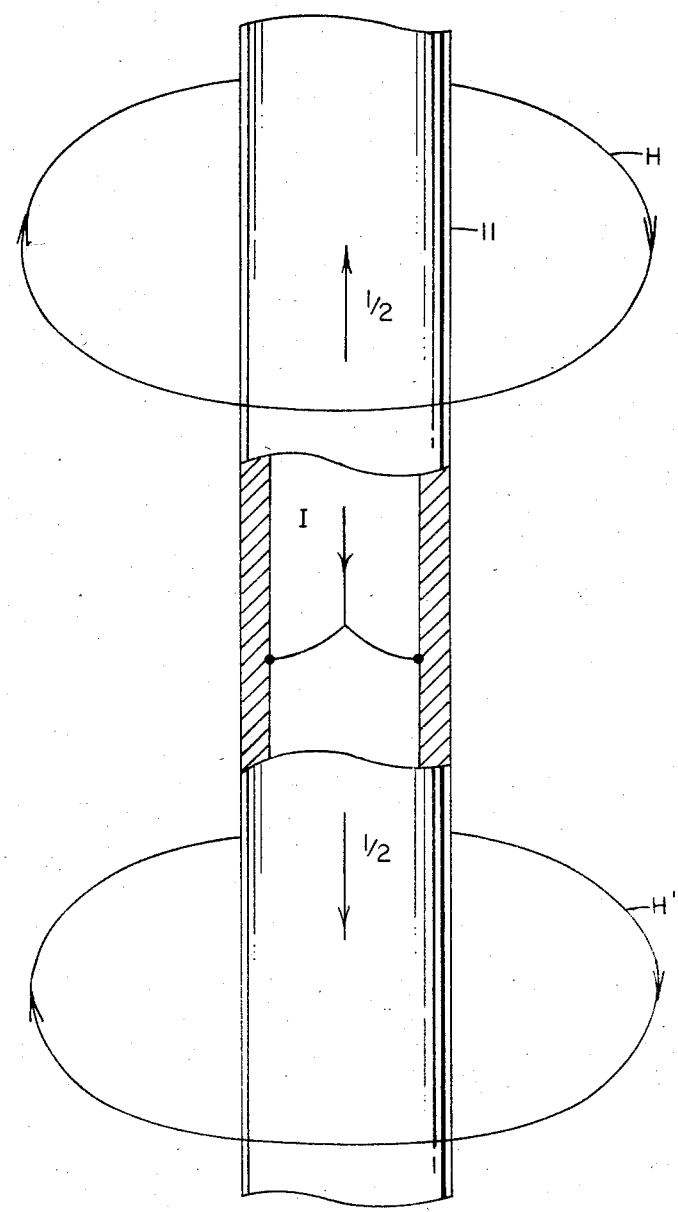
FIG. 2 illustrates the flow of current injected into the well casing of FIG. 1.

A typical wellbore 10 is shown in FIG. 1 lined with steel casing 11 and anchored by a sheath of cement 12 which is circumferentially bored to both the casing 11 and the wall of the wellbore 13. A current sonde 14 with releasable contact pads 15 and 16 is lowered through the casing 11 to a desired depth by means of the insulated cable 17. At the desired location, the pads 15 and 16 are released by the spring loaded arm members 18 and 19. Pads 15 and 16 are equipped with current emitting electrodes which make contact with the well casing 11. Current supplied from the uphole power supply 22 passes through the sonde 14 and the contact pads 15 and 16 into the well casing 11 at the desired depth location. At this depth location about one-half the current flows up the casing 11 while about one-half the current flows down the casing 11 as illustrated in FIG. 2. There is also a small leakage current to the formation per unit length of casing. As can be further seen in FIG. 2, the upward current flow in casing 11 subtracted from the cable current I generates a magnetic field H in a first direction about the casing while the downward current flow generates a magnetic field H' approximately equal to H in the same direction about the casing. In this manner, the entire magnetic field, both above and below the current injection point, is in one direction about the well casing. Such magnetic fields can be generated about a production well at a desired depth or deviation of direction and can be detected by a magnetometer located in a non-magnetic section of the drill string in a new well being drilled nearby to prevent any inadvertent drilling of the new well into the production well at such depth or deviation of direction. Current injection techniques of the type described in the aforementioned U.S. Patent to Kuckes would not be acceptable since a current injection through the formation from an adjacent well would create equal, but opposing magnetic fields at the current injection point by the equal and opposing current flows above and below the current injection point. These opposing magnetic fields cancel each other along a portion of the well casing on either side of the current injection point, thereby the drilling into the well at such point where there is no detectable magnetic field would be possible.

The current injection point should be as close to the likely intersection point between the two wells as possible. The further the injection point is from the desired depth point, the weaker the magnetic field will be at the desired depth point. If the current were injected at a point on the casing near the surface of the earth, the current would be attenuated rapidly with depth due to leakage through the surrounding formations. For example, with one ampere of current injected into the casing at the surface of the earth, about $10^{-7}$ amperes would be flowing in the casing at a depth of about 10,000 feet. The magnetic field created at 10,000 feet is thus greatly reduced. However with one ampere of current injected at the 10,000 foot depth in accordance with the present invention, about one-half ampere of current will be flowing in each direction in the casing with a much larger resulting magnetic field.

Figure 3:
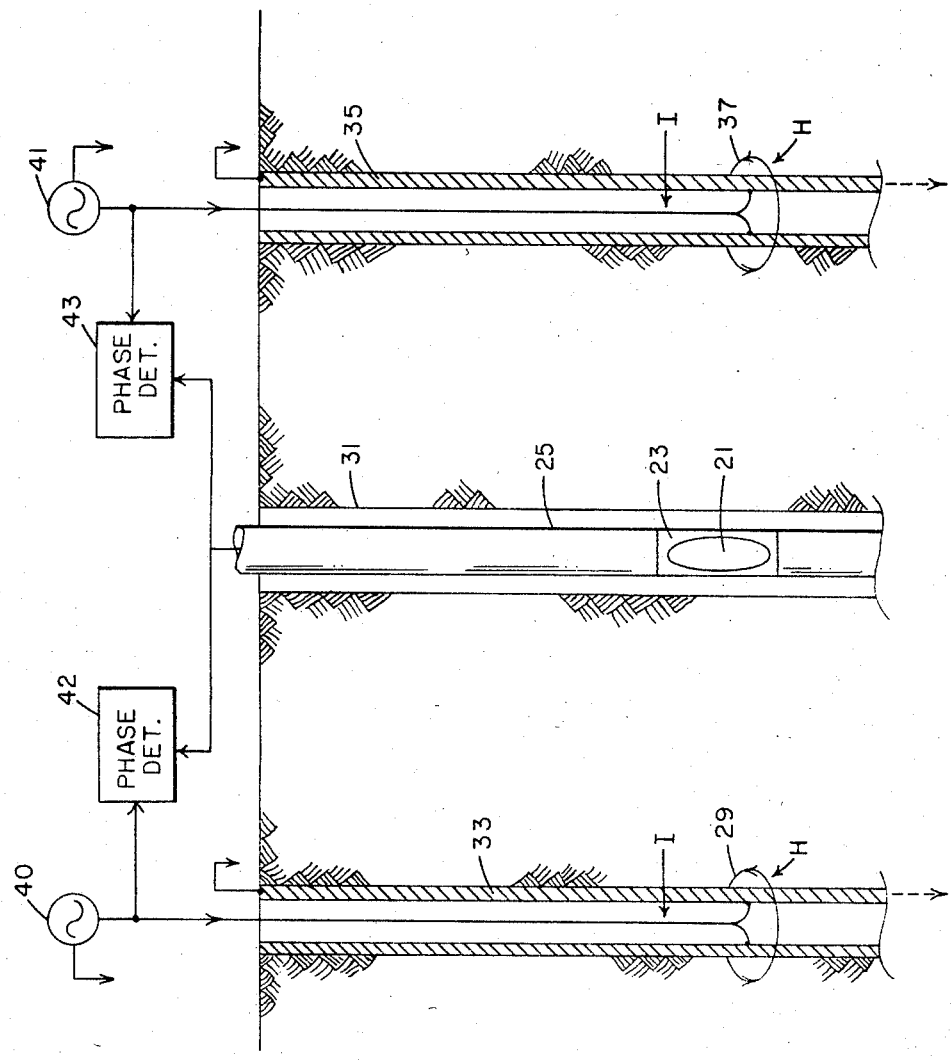
FIG. 3 illustrates the use of a magnetometer in a second well to measure the magnetic field in a first well.

Referring to FIG. 3, to prevent the drilling of a new well 31 into any one of a plurality of production wells (two such production wells 33 and 35 being shown for simplicity) current is injected into the casings of said production wells at a selected depth point in the manner described above. A magnetometer 21 is located in a non-magnetic section 23 of the drill string 25 of the new well 31 and the magnetic fields 29 and 37 around the well casings of the production wells 33 and 35 are measured by the magnetometer 21. Drilling of the new well is redirected when the measurement of the magnetic field indicates that the continued drilling of the new well would result in the intersection of the new well with one of said production wells. To aid in such measurement, a different frequency alternating current is injected into each production well by the alternating current sources 40 and 41, thereby creating differing detectable magnetic fields for each of the producing wells. Preferable frequencies will be in the range of about 0.1 Hz to about 30 Hz. The phase of each of the injected currents is continuously compared with the magnetometer output by the phase detectors 42 and 43. A valid phase comparison from one of the phase detectors will identify which of the production wells is in danger of being intersected by the new well and further drilling of the new well can be redirected away from the identified production well. This distinguishes the present invention over the aforementioned U.S. Patent to Kuckes in that if two wells are involved and a third well is being drilled between them, the current injection technique of the Kuckes system would cause cancelling magnetic fields to be generated in each of the two wells making it impossible to determine the position of one or the other of the two wells. In the present invention, this problem is completely avoided since each well is individually energized using different frequencies such that a magnetometer in a well being drilled can easily distinguish the various well magnetic fields and accurately determine its position relative to a predetermined energized well. An additional feature of the invention is that injecting a current directly into the well casing causes a larger magnetic field to be created by a given amount of power than can be created with the aforementioned Kuckes system which must rely on currents flowing through the earth in order to magnetize the well casing.

It is to be understood that the foregoing merely describes one embodiment of the present invention. Various modifications, as well as alternate embodiments, may become apparent to one skilled in the art without departing from the scope and spirit of the invention as hereinafter defined by the appended claims.

I claim:

1. A method for preventing the drilling of a first well into any one of a plurality of second wells, comprising the steps of:
(a) lowering a borehole tool into one of said plurality of second wells and injecting an alternating current flow into the well casing of said well from said tool at a selected depth point such that a first magnetic field is created above said point of injection around said well due to the difference in the opposing current flows downward through said borehole tool and its support cable to said point of injection and upward through said well casing from said point of injection and a second magnetic field is created below said point of injection around said well casing due to the downward current flow from said point of injection, said first and second magnetic fields being equal in both direction and magnitude so as to create a uniform magnetic field along the length of the well casing both above and below said point of injection,
(b) repeating step (a) for each of the remaining ones of said second wells utilizing a differing alternating current frequency for each of said second wells to create a magnetic field around each of said second wells, each of said magnetic fields having a differing detectable characteristic based on the phase of the alternating current creating said magnetic field,
(c) locating a magnetometer in a non-magnetic section of the drill string of said first well,
(d) measuring the magnetic field intercepted by said magnetometer during the drilling of said first well, and
(e) redirecting the drilling of said first well when the measurement of said magnetic field indicates that the continued drilling of said first well would result in the intersection of said first well with one of said second wells.

2. The method of claim 1 wherein the step of redirecting the drilling of said first well includes the step of comparing said measured magnetic field with the phase characteristic of the currents injected into each of said second wells.

3. The method of claim 1 wherein said alternating currents injected into said plurality of second wells vary in frequency from about 0.1 Hz to about 30 Hz.

* * * * *